Jan. 21, 1969   R. M. PETRIE   3,422,925
ROPE CONNECTOR

Filed Oct. 14, 1966   Sheet 1 of 2

INVENTOR.
ROBERT M. PETRIE
By White & Haefliger
ATTORNEYS.

Jan. 21, 1969  R. M. PETRIE  3,422,925

ROPE CONNECTOR

Filed Oct. 14, 1966  Sheet 2 of 2

INVENTOR
ROBERT M. PETRIE
By White & Haefliger
ATTORNEYS.

United States Patent Office 3,422,925
Patented Jan. 21, 1969

3,422,925
ROPE CONNECTOR
Robert M. Petrie, 8268 Fernadel,
Pico Rivera, Calif. 90660
Filed Oct. 14, 1966, Ser. No. 586,759
U.S. Cl. 182—196       15 Claims
Int. Cl. E06c 1/56; F16g 11/06

ABSTRACT OF THE DISCLOSURE

A connector for attachment to spiral strand line is provided comprising in combination a split sleeve applicable laterally to extend about the line anywhere along the line length, which sleeve is elongated and has internal ribbing sized to engage with the strand of the line and retaining means removably carried by the sleeve and sized to retain the sleeve in interfitting frictional engagement with strands against longitudinal displacement along the line.

---

This invention relates to novel connectors for attachment to spiral strand line such as rope or cable. The invention is also concerned with the fastening to such line of various support structures by means of a novel connector affording quick connections or disconnection anywhere along the line and positive engagement with the line against axial and rotative slippage.

Elongated spiral strand line such as conventional rope is composed of a plurality of strands arranged into successive lays by twisting of the strands about one another. It is characteristic of spiral strand line to have a continuous helical groove running along the exterior of the line between adjacent lays.

It is often required to attach to such line various structural forms such as hardware for the purpose of thereafter securing to the line structures useful in converting the line into an article of manufacture such as a rope ladder or to secure the line to a stationary object or to vary the length of the line so as to increase or decrease tension in the line. In each instance, there is a need for a connector which can be fastened on the line. Often the connector must be placed intermediately of the ends of the line. Also it is sometimes desirable that there be an adjustability in the connector so that following the initial attachment, orientation or other alinement can be corrected as needed. Prior to the present invention, connectors have either not been easily adaptable to midline connection, or once secured immediate the line ends, they have not been readily adjustable longitudinally or angularly of the line.

This invention provides a connector for attaching to spiral strand line which is easily and readily applicable anywhere along the line length, is securable to the line in any position, and in addition, is easily and readily adjustable selectively along the line length. A particular advantage of the invention is found in the provision of an adjustable securable connector affording a positive interlock with the supporting line, which does not depend on an undue tightening against a small axial portion of the line. In the past such compression has caused breaking of exterior strand filaments resulting in accelerated fraying of the lines. Moreover, as will be seen hereinafter, the connector device of the present invention is of a design which applies uniform pressure over an axially elongated portion of the line, so that clamping pressure is distributed widely and uniformly.

In particular, there is provided for attachment to an elongated spiral strand line, in combination, a split sleeve, applicable laterally to extend about the line at a selected position, elongated and having internal ribbing sized to engage with the strand of the line, and retaining means removably carried by the sleeve and sized to retain the sleeve in interfitting frictional engagement with the strands against longitudinally displacement therealong.

The retaining means, removably carried by the split sleeve, may be separately formed for application about the sleeve and may be completely or only partially removable for lengthwise adjustment of the sleeve along the line. The ribbing of the sleeve can be formed integrally therewith or be added to a preformed sleeve in which case a fibrous bead, e.g. of material similar to the rope fiber can be arranged within the sleeve as ribbing to approximate in pitch and height the configuration of the helical groove running about the spiral strand line. The sleeve itself is split to be openable along one or more sides, e.g. at opposite sides or conveniently along a helical line running the length of the sleeve suitably parallel to and between the sleeve ribbing. A split sleeve configured as a helix will be adjustable along the stranded line simply by removal of the retaining means and local deflection of the sleeve wall supporting the ribbing to lift the ribbing over the groove defining lays of the spiral line.

The connector retaining means may be provided with a fastener adapted to fasten to the connector various kinds of support structure which it is desired to secure to the line. Commonly, the fastener will be an interiorly or exteriorly threaded nipple projecting from and generally formed on the wall of the retaining means and useful for thread connecting various support structures in or to the line. Or, a turnbuckle arrangement can be produced by securing a threaded retaining means at the end of a line and thread connecting a turnbuckle thereto. Similarly, a connector can be positioned along a line and a fastening nipple provided at or intermediate the ends of the retaining means to form a T to which a structure such as the cross-piece or step of a rope ladder can be secured.

The invention will be further described in conjunction with the attached drawings in which.

As will be apparent from the drawings, the invention provides, for attachment to an elongated spiral strand line, a combination of a spilt sleeve applicable laterally to extend about the line at a selected position therealong and having internal ribbing sized to inter-engage with the twisted strands of said line, and retaining means removably carried by the sleeve and sized to retain the sleeve in interfitting frictional engagement with the strand and against longitudinal displacement therealong.

Figure 1:
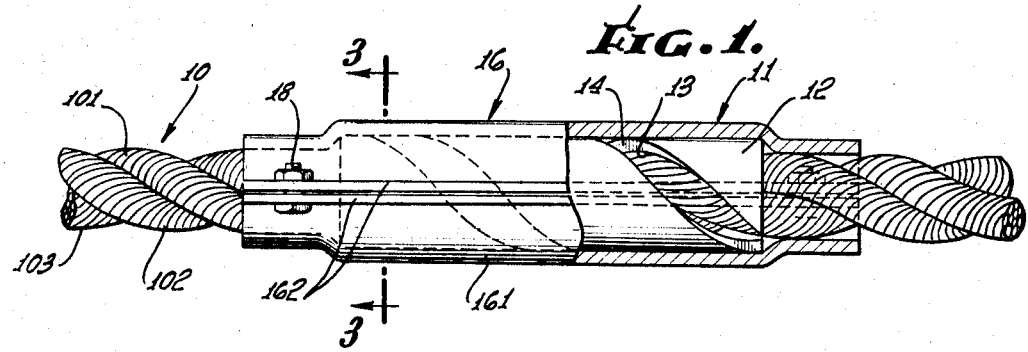
FIG. 1 is a side view in elevation of a typical connector according to the present invention partially broken away to show the underlying split sleeve structure.
Figure 2:
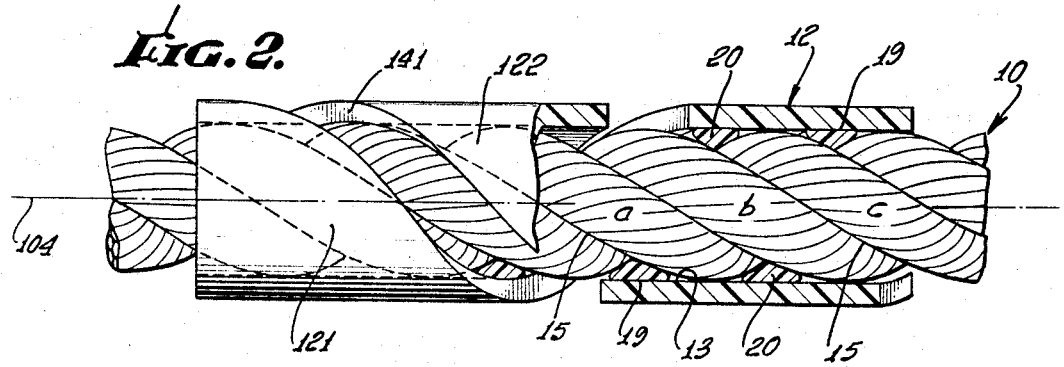
FIG. 2 is an enlarged fragmentary view of the split sleeve in position around the line.
Figure 3:
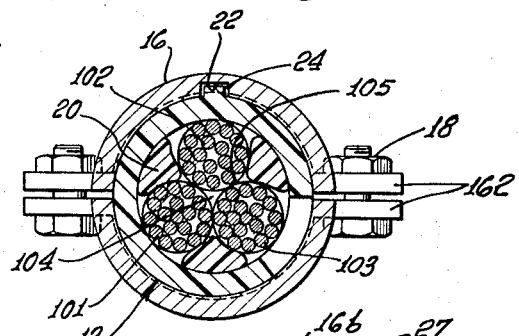
FIG. 3 is a cross-section taken along line 3—3 in FIG. 1.

Turning now to the drawings in detail, in FIGS. 1–3, there is shown at 11 a connector device according to the present invention attached to an elongated line 10 formed of three strands 101, 102 and 103 twisted about the line axis 104 into lays a, b, c, etc. The connector device includes a generally cylindrical sleeve 12 having bore 13 sized to closely overfit the strand line 10. The sleeve is spilt from end to end along parting line 14 which may be diagonal or parallel to the axis 104 and is preferably helical as clearly shown in FIG. 2. A helical sleeve is advantageous in being locally deflectable, i.e., one or more sections can be moved without immediate movement of the others. For example, band 121 of the sleeve can be lifted away from the strand line and adjusted axially therealong for limited distances without corresponding movement of sleeve band 122, by the relative widening or narrowing of, e.g. portion 141 of the parting line. In use, the split in the sleeve enables lateral applicability of the sleeve to the strand line, as by insertion of the line into the sleeve, e.g. at opening 141 between the sleeve bands 121 and 122 and urging the sleeve around the strand line so that the line moves through the sleeve completely and is entirely embraced within the sleeve bore 13.

Within this bore, there is provided means for engaging the sleeve with the strand line. For example, as best shown in FIGS. 2 and 3, ribbing 20 projects from the sleeve bore. The purpose of the ribbing or other engaging means is to anchor the sleeve to the strand line against their relative movement. To do this, advantage is taken of the surface recesses characteristic of strand line such as helical groove 15 defined by adjacent lays a, b, c etc. This groove has a depth dependent on the diameter of the constituent strands of the line, a pitch generally dependent on the tightness of the twist in the line, and a generally V-shaped cross-section. For engaging in this groove against movement, means capable of entering the groove either continuously or at intermittent points are provided, such as ribbing 20 having a spiral conformation to interfit with the strands of the line. In general, the ribbing will project from the sleeve bore so as to enter substantially completely the groove 15. A quite large surface-to-surface contact between the ribbing and the groove defining lays results providing excellent gripping action and wide load distribution.

In a typical case, the ribbing 20 will be of triangular cross-section, generally congruent with the cross-section of the groove 15, and will preferably be a continuous helix of a pitch corresponding to the groove pitch. In the helical sleeve embodiment of FIGS. 1–3 the split line 14 and ribbing 20 are generally parallel throughout their extents so that the split line too corresponds in pitch to the groove 15. The ribbing can be of the same or different material as the sleeve and is generally of a material resistant to compression. For example, it has been found that ribbing formed of fibers like those constituting the strand line provide the proper degree of incompressibility, ease of arrangement into ribbing and surface friction for successful use as ribbing. The sleeve shown in FIGS. 1–3 employs helically arranged fibers adhered to the sleeve bore at 19 with a suitable adhesive. In addition to traditional rope materials, such as cotton, hemp and jute and other natural fibers, synthetic materials such as cotton, hemp and jute and other natural fibers, synthetic materials such as polypropylene, nylon, polyethylene terephthalte (Dacron (trademark)) can be used for fibrous ribbing, as well as for the strand line itself.

The sleeve is formed of a material having relatively good mechanical properties including wood, plastics and metals. Plastics are low cost and can be molded into the required shapes easily and are preferred materials where some flexibility is desired. For example, a sleeeve having a helical parting line as illustrated in FIGS. 1–3 is desirably formed of polyethylene or other synthetic organic plastic material, to enable local deflection of the sleeve and facilitate insertion of the strand line into the sleeve. In addition, flexibility in the wall of the sleeve enables lifting of the ribbing 20 adhered to the sleeve over the lay intervening between adjacent grooves 15 of the strand line.

A further advantage of a moldable sleeve material is that the ribbing 20 can be molded integrally with the sleeve itself as an alternative to forming ribbing separately within the sleeve. Where the parting line for the split sleeve is helical, the ribbing will generally parallel the line.

Figure 7:
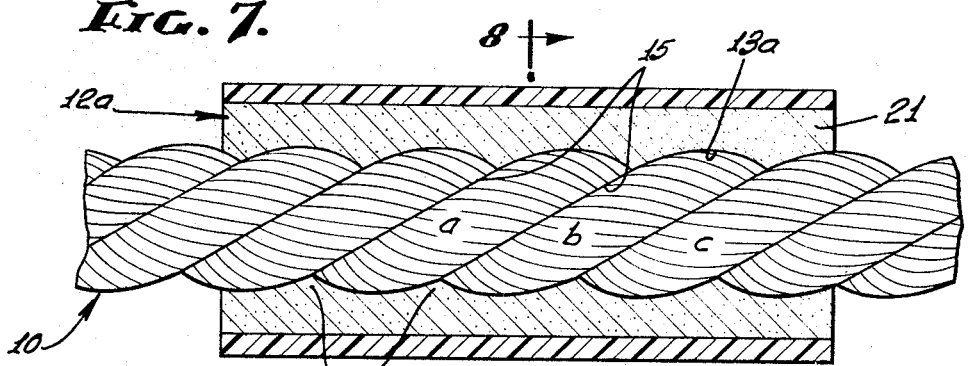
FIG. 7 is a side elevation view, generally in section, of an alternative embodiment of the connector of the present invention.
Figure 8:
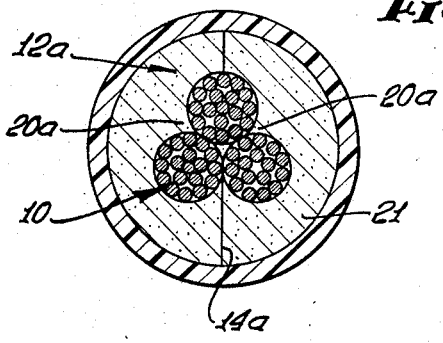
FIG. 8 is a cross-section taken along line 8—8 in FIG. 7.

In FIGS. 7 and 8 a sleeve 12a having integrally molded ribbing 20a is shown in position around strand line 10. The material 21 from which the sleeve 12a is formed can be an organic material such as a thermoplastic resin or for lower cost, a hydraulic setting material such as cement or plaster of Paris, i.e. a calcium compound containing material, particularly a calcium salt, e.g. calcium sulfate containing material. The sleeve 12a is split longitudinally into two halves along parting line 14a for arrangement around the line 10 with the wall of interior bore 13a configured to conform to the lays a, b, c and intervening grooves 15 of the line 10.

Once the sleeve 12 is positioned about the line 10 with ribbing 20 snugly interfitting with grooves 15, the sleeve is secured in place on the line by a retaining means 16. Since the sleeve is split, and therefore radially deflectable, it is necessary to circumferentially enclose the sleeve against unwanted radial deflection to prevent loss of engagement between the sleeve ribbing and the strand line. This is accomplished by the use of a retaining means.

Figure 9:
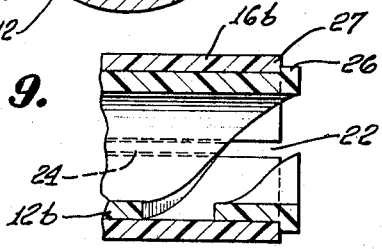
FIG. 9 is a view in section of an alternate arrangement of sleeve and retaining means in accordance with the present invention.

The retaining means is generally cylindrical and may be a tubular member 16 sized to snugly fit over the sleeve 12. Formed of material of suitable strength such as those used to fabricate the sleeve, especially a metal or plastic material, the retaining means can be unitary and seamless as illustrated in FIGS. 7 and 8 or, as in the other figures, be formed of two or more sections fastenable together, e.g. a pair of mating semi-cylindrical shells 161 having perimetrical flanges 162 apertured to receive nut and bolt fasteners 18. Slippage of the retaining means longitudinally of the sleeve is prevented by any or all of (1) friction engagement between the sleeve and retaining means, (2) necked down portions of the retaining means at the ends thereof extending beyond the sleeve such as shown in FIGS. 1–3 or (3) by means of stop shoulders 26, 27 between the sleeve 12b and retaining means 16b (FIG. 9). Rotative motion relatively of sleeve and retaining means may be prevented by fitting a keying bead 24 raised on sleeve 12 in keyway 22 sunk in retaining means 16.

Fitting of the retaining means around the sleeve presses ribbing 20 inwardly into the groove 15 of the strand line 10. Compressive forces exerted by the retaining means hold the ribbing tightly in place. The forces acting laterally on the ribbing tend to flatten it and enhance the frictional engagement between the sides of the ribbing and the adjacent lays as well as forcing the ridge 21 of the ribbing to the bottom of the helical groove 15.

Rapid connection, adjustment and removal of the connector device can be readily accomplished anywhere along the strand line length. Thus to apply the connector midway along a line, the sleeve is wrapped around the line by abutting two sleeve halves on either side of the line or winding a helical sleeve onto the line. The ribbing projecting interiorly of the sleeve is registered with the grooves of the line. Once registration is accomplished the sleeve is clamped in place by fitting a retaining means in place over the sleeve, laterally or endwise and in registration with a keying bead, if any, on the sleeve, to urge the ribbing into intimate contact with the line lays and groove. Rotative or axial adjustment of the connector is quickly accomplished by relieving the pressure exerted by the retaining means on the sleeve, turning or sliding the sleeve by hand to the desired orientation or position and reassembling by replacing the retaining means.

Figure 4:
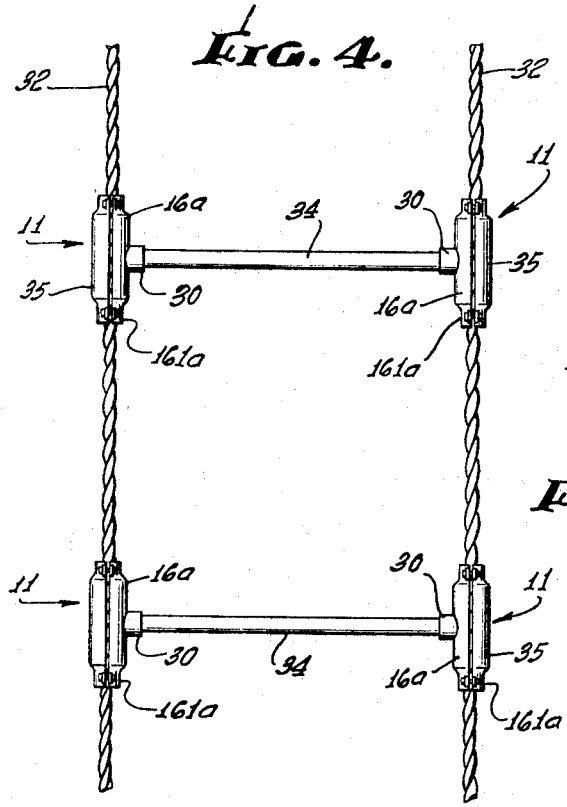
FIG. 4 is a view in elevation of a ladder arrangement employing a plurality of connector T's according to the invention.

The connector may be provided with a fastener, secured to the retaining means, to which to fasten auxiliary support structures desired to be attached to the stranded line. For example, in FIG. 4 a number of connector devices 11 are shown of the type depicted in FIG. 1, except that an internally threaded nipple 30 projects from the retaining means 16a. A pair of riser members such as stranded lines 32 are extended in parallel relation, and step-like cross-pieces 34 are disposed generally perpendicularly to the riser lines. At the intersection of the riser lines and cross-pieces, a T 35, embodying the connector device of the present invention, is provided to secure the various members to one another. In particular, cross-piece 34 is fitted into and suitably thread connected in the nipple 30. The cross-piece is thus supported between the risers so that force on the cross-piece, such as results from using the arrangement as a ladder urges retaining member 16a downward, the resulting pressure is transferred by reduced diameter end portion 161a of the retainer means to the split sleeve (not shown) which, in turn, translates the load to the ribbing (not shown) which, by engagement with the stranded line, resists longitudinal displacement, so that the crosspiece is supported by the line against the applied force.

Figure 5:
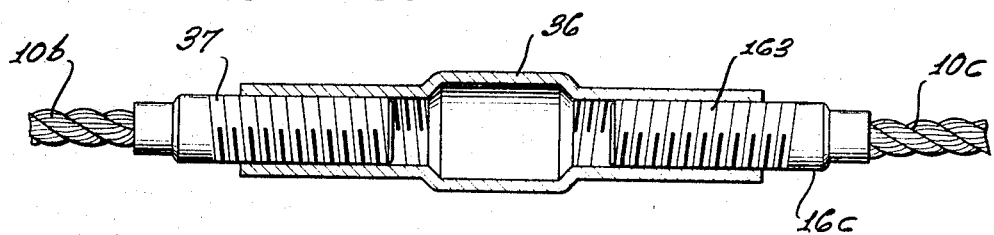
FIG. 5 is a side view partly in section of a turnbuckle arrangement employing connector devices of the present invention.
Figure 6:
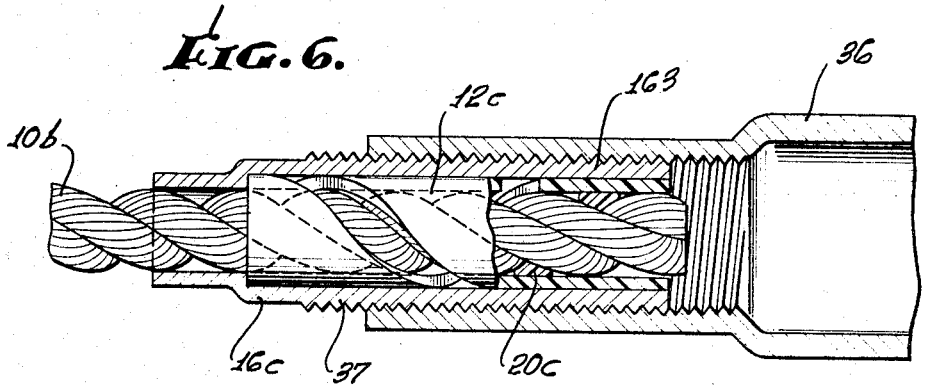
FIG. 6 is a detailed view, generally in section, of a portion of the turnbuckle arrangement shown in FIG. 5, partly broken away to show the engagement of the sleeve ribbing with the standard line.

Further, use can be made of the connector device of the present invention where line length adjustability is desired. Conventionally, turnbuckles are used to shorten or lengthen line fixed between two points or for purposes of adjusting tension. Heretofore, it has often been necessary to apply undue compressive force on the terminal positions of the line or to induce a bend at the end of the line as for an "eye" to support the hardware to be thread connected to the turnbuckle. By use of the connector device of the present invention, terminal loads on lines can be more uniformly distributed and excessive compression avoided in the use of turnbuckle adjusters. In general, means for effectuating adjustment of the length of an elongated spiral strand line includes a connector device 37 attached to a first end of the line 10b and means such as turnbuckle 36 connectible to the fastener of the connector device adapted to move the connector relative to the second end of the line 10c. In FIG. 5, for example, a typical turnbuckle arrangement is shown. A pair of line ends 10b and 10c are each provided with the above described connectors including a retaining means 16c which is exteriorly threaded at 163 to be thread connected in turnbuckle fastener 36. As is conventional, the turnbuckle is right- and left-hand threaded so that rotation in either direction produces opposing movement of the connectors threaded into the turnbuckle. As most clearly shown in FIG. 6, the turnbuckle connector includes the externally threaded retaining means 16c, and a helical split sleeve 12c provided with internal ribbing 20c, which grips the stranded line 10b and enables axial exertion of force on the line by turnbuckle rotation.

Figure 10:
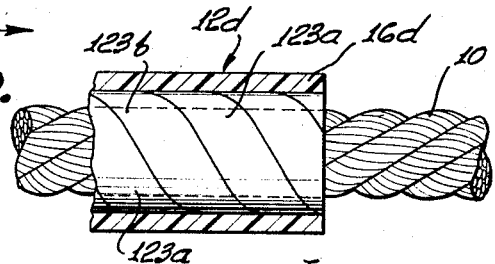
FIG. 10 is a view in side elevation of an alternate form of the connector.

In the assembly of rope ladders or other uses of the connector of the present invention it may be desired to secure to wire rope. It is advantageous to employ a split sleeve of appropriate bore and of rigid, i.e. normally non-deflectable construction such as heavy gauge plastic or a metal casting. Where the sleeve is helical, to facilitate its arrangement about the line, the pitch distance of the helical sleeve is increased to permit easy insertion of the line between convolutions. A continuous sleeve can be provided nonetheless, however, by use of a pair of rigid helical members intertwined to define the sleeve. As seen in FIG. 10 sleeve 12d is comprised of helical members 123a and 123b formed of rigid material with complementary pitch distances to be intertwinable on the line 10. Installation of this sleeve is accomplished by first threading helical members 123a and 123b onto the line 10 at different positions and then fitting these sections together with a twisting motion in the desired place along the line. Retaining means 16d is then slipped over the intertwined helical members to complete the connector. Apart from the differences just noted, the connector device of FIG. 10 is similar to the devices described above.

It will be seen from the foregoing that the present invention provides a novel connector means by means of which there is fastenable to stranded line various forms of support structures including rigid spacing members such as ladder steps and thread-adjustable interconnections such as turn-buckles.

I claim:

1. For attachment to an elongated spiral strand line, in combination a substantially uniform internal diameter split sleeve applicable laterally to extend circumferentially about the line at a selected position therealong and having internal ribbing sized to inter-engage with the strands of said line, and retaining means removably carried by the sleeve and sized to retain the sleeve in inter-fitting frictional engagement with the strands and against longitudinal displacement therealong.

2. Combination as claimed in claim 1 in which said retaining means is separately formed.

3. Combination as claimed in claim 1 in which the sleeve is generally cylindrical and said ribbing has spiral conformation to interfit with the strands of said line and said retaining means urges said ribbing into the groove between adjacent strands.

4. Combination claimed in claim 3 in which said ribbing is integral with said sleeve.

5. Combination as claimed in claim 3 in which the ribbing comprises fibrous material adhered to said sleeve.

6. Combination as claimed in claim 1 in which a pair of rigid helical members are intertwined to define said sleeve.

7. Combination as claimed in claim 1 in which the sleeve is helically shaped and locally deflectable upon removal of said retaining means to enable selective relative movement of the sleeve longitudinally along said line.

8. Combination as claimed in claim 1 in which said retaining means is tubular to receive said sleeve therein.

9. Combination as claimed in claim 1 including also a fastener on said retaining means adapted to fasten to auxiliary support structure.

10. Combination as claimed in claim 9 in which support structure includes lines fastened to said retaining means.

11. In a ladder structure including a pair of generally parallel and spaced spiral strand lines, a plurality of cross-pieces extending generally perpendicularly to the lines, and connectors to interconnect the cross-pieces and lines, each connector defined by the combination claimed in claim 9 arranged with the split sleeve frictionally engaged with one of said lines and held by said retaining means and the cross-piece fastened to said fastener of said retaining means.

12. The combination of claim 9 in which said fastener and retaining means have adjustable interconnection.

13. Combination as claimed in claim 12 in which said adjustable interconnection comprises interfitting screw threads.

14. Combination as claimed in claim 3 in which said split sleeve and ribbing is comprised of a set hydraulic material.

15. Combination as claimed in claim 6 including also a fastener on said retaining means adapted to fasten to auxiliary support structure.

References Cited

UNITED STATES PATENTS

| | | | |
|---|---|---|---|
| 2,266,214 | 12/1941 | Kellems | 24—123.5 |
| 2,390,192 | 12/1945 | Clair | 24—125 |
| 2,729,054 | 1/1956 | Peterson | 248—63 |
| 2,755,981 | 7/1956 | Edwards | 182—228 |
| 3,008,537 | 11/1961 | Roberts | 182—196 |
| 3,016,868 | 1/1962 | Haas | 248—63 |
| 3,128,843 | 4/1964 | Anagnostou | 182—198 |
| 3,254,383 | 6/1966 | Ehmann | 24—126 |

REINALDO P. MACHADO, *Primary Examiner.*

U.S. Cl. X.R.

24—125